United States Patent
Lewellyn

(10) Patent No.: US 11,642,922 B2
(45) Date of Patent: May 9, 2023

(54) AUTOMATIC DEFLATOR VALVES WITH VORTEX-LIKE AIR FLOW WITH IMPROVED TIRE VALVE STEM CONNECTION

(71) Applicant: Harry Lewellyn, Costa Mesa, CA (US)

(72) Inventor: Harry Lewellyn, Costa Mesa, CA (US)

( * ) Notice: Subject to any disclaimer, the term of this patent is extended or adjusted under 35 U.S.C. 154(b) by 0 days.

(21) Appl. No.: 17/818,253

(22) Filed: Aug. 8, 2022

(65) Prior Publication Data
US 2023/0039845 A1 Feb. 9, 2023

Related U.S. Application Data

(60) Provisional application No. 63/231,162, filed on Aug. 9, 2021.

(51) Int. Cl.
| | |
|---|---|
| *B60C 29/06* | (2006.01) |
| *F16K 17/04* | (2006.01) |
| *F16K 17/06* | (2006.01) |

(52) U.S. Cl.
CPC .......... *B60C 29/068* (2013.01); *F16K 17/044* (2013.01); *F16K 17/0433* (2013.01); *F16K 17/06* (2013.01); *F16K 17/0486* (2013.01); *Y10T 137/36* (2015.04); *Y10T 137/7738* (2015.04); *Y10T 137/7876* (2015.04)

(58) Field of Classification Search
CPC ............... F16K 17/0486; Y10T 137/36; Y10T 137/3677; Y10T 137/3724; Y10T 137/7738; Y10T 137/7776; Y10T 137/7925; Y10T 137/7929
See application file for complete search history.

(56) References Cited

U.S. PATENT DOCUMENTS

| | | | | | |
|---|---|---|---|---|---|
| 287,131 | A | * | 10/1883 | Jarecki ................... | F16K 17/082 137/472 |
| 1,672,504 | A | * | 6/1928 | Sauvey ................... | F16K 17/00 137/533.29 |
| 3,189,040 | A | * | 6/1965 | Arthur .................. | F16K 17/044 137/542 |
| 3,702,141 | A | * | 11/1972 | Wetterhorn ........... | F16K 17/082 137/542 |
| 4,168,723 | A | * | 9/1979 | Schneider ............. | F16K 17/168 137/614.19 |
| 4,226,261 | A | * | 10/1980 | Ekeleme, Jr. ......... | F16K 17/082 137/477 |
| 4,273,151 | A | * | 6/1981 | Nezworski ............. | B67D 1/125 137/115.17 |

(Continued)

*Primary Examiner* — Robert K Arundale
(74) *Attorney, Agent, or Firm* — Nguyen Tarbet LLC

(57) ABSTRACT

An improved deflator valve is described herein. The deflator valve has a main body with one or more ports, one or more vents, or port or vent slots for introducing air into or relieving pressure from within the main body in a vortex, circular flow. The deflator valve also includes a piston having an O-ring disposed around an outer circumference of the piston. The O-ring of the piston and the ports and vents are effective for reducing noise and deflation time and improving accuracy and ease of adjusting a pressure setting. The deflator valve can further include a dual or variable rate spring that can achieve an extensive destination pressure range. The deflator valve can also include a threadless lead in, fewer valve stem threads, or a lock chuck for enhanced valve stem attachment methods.

20 Claims, 9 Drawing Sheets

(56) References Cited

U.S. PATENT DOCUMENTS

| | | | | |
|---|---|---|---|---|
| 4,543,987 | A * | 10/1985 | Ekeleme, Jr. | F16K 17/0413 |
| | | | | 251/86 |
| 4,768,550 | A * | 9/1988 | Krechel | F16K 1/305 |
| | | | | 137/542 |
| 5,131,275 | A * | 7/1992 | Huang | G01L 19/0618 |
| | | | | D10/85 |
| 9,802,449 | B1 * | 10/2017 | Lewellyn | B60C 29/068 |
| 2006/0071189 | A1 * | 4/2006 | Cornwell | F16K 17/0486 |
| | | | | 251/55 |
| 2015/0059884 | A1 * | 3/2015 | Grenaway | F16K 17/0486 |
| | | | | 137/538 |
| 2019/0093777 | A1 * | 3/2019 | Quan | F16K 17/168 |
| 2019/0170266 | A1 * | 6/2019 | Quaglia | F16K 17/082 |

* cited by examiner

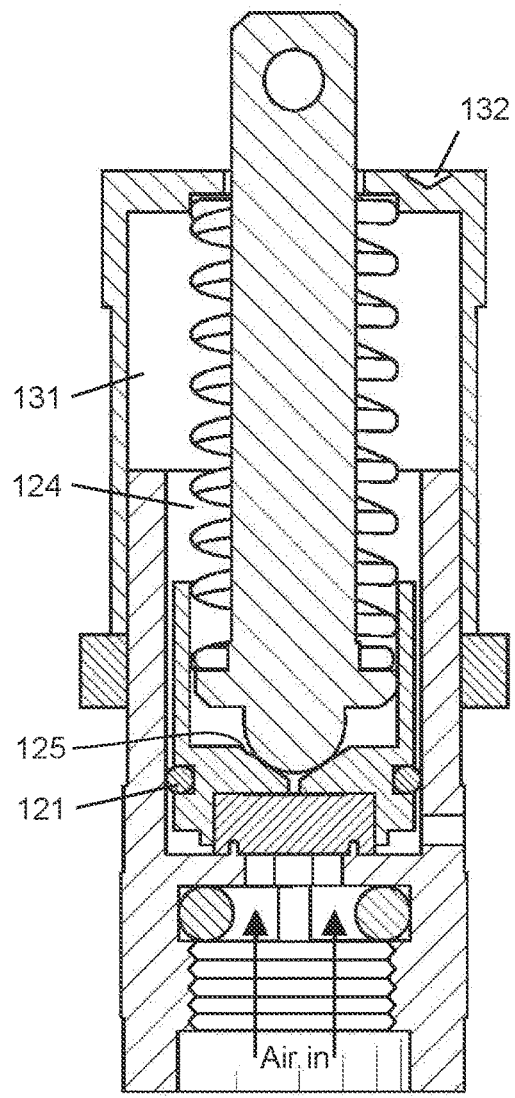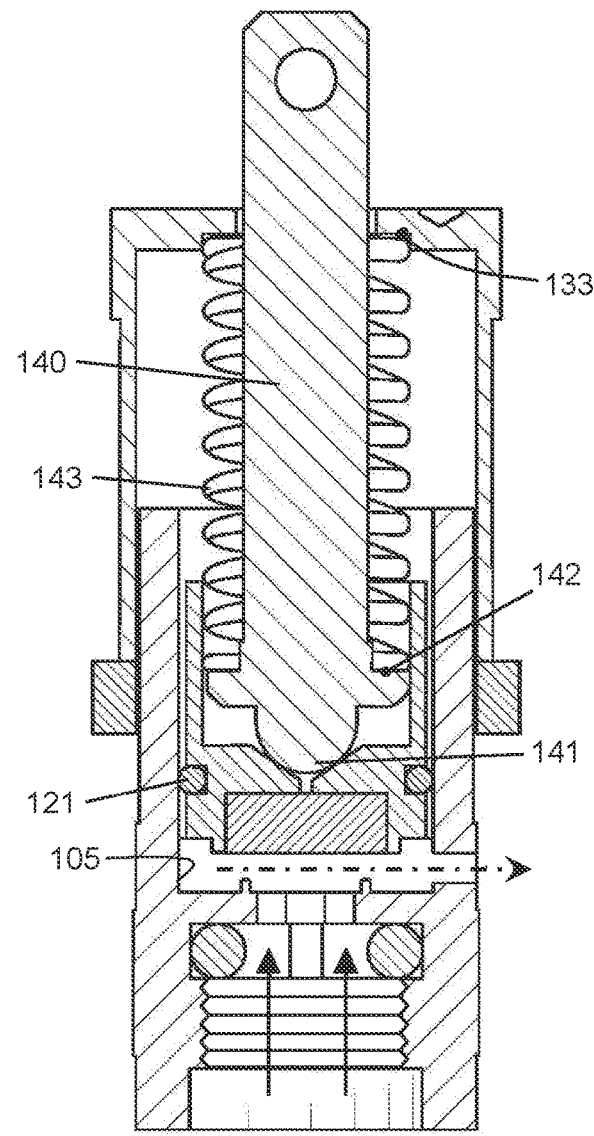
FIG. 1B
FIG. 1C

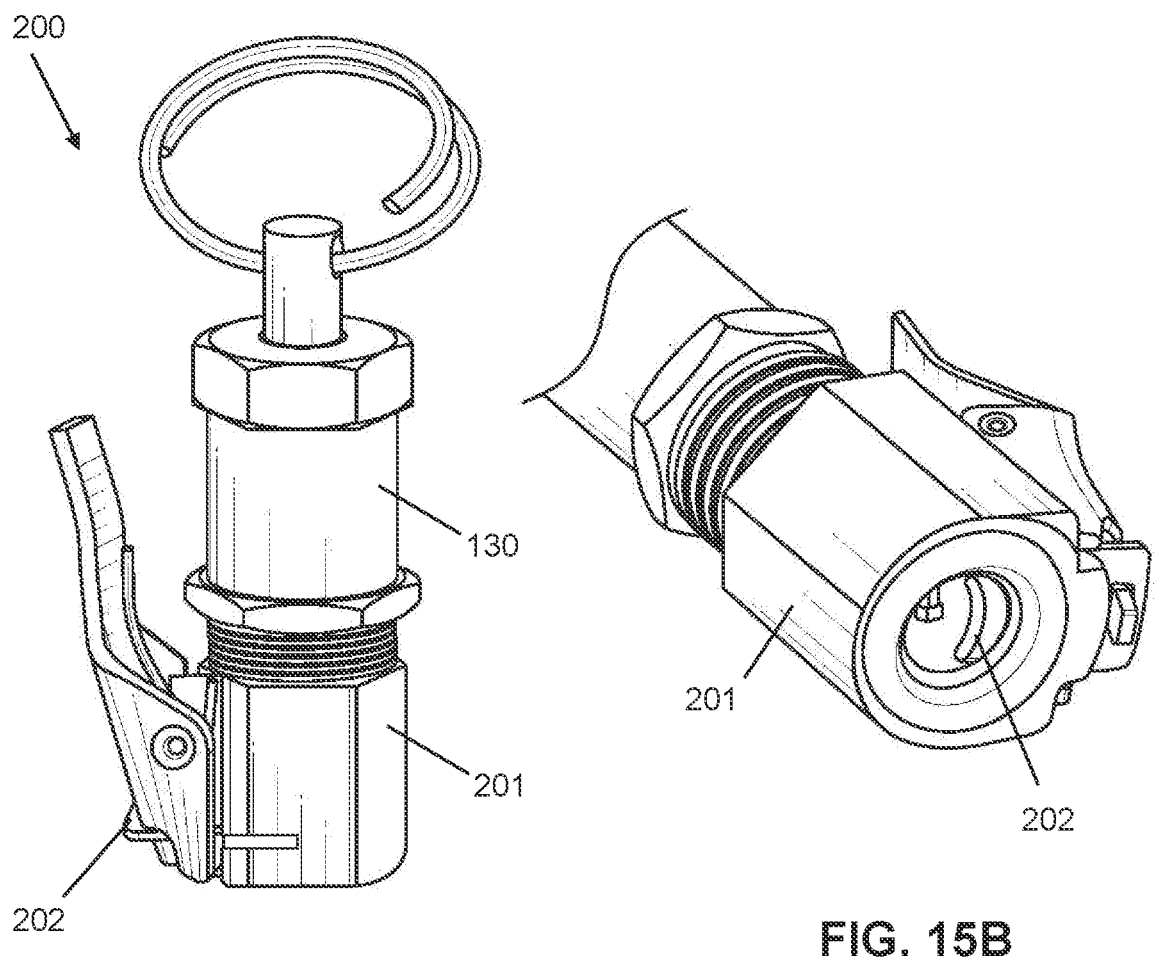
FIG. 15A
FIG. 15B
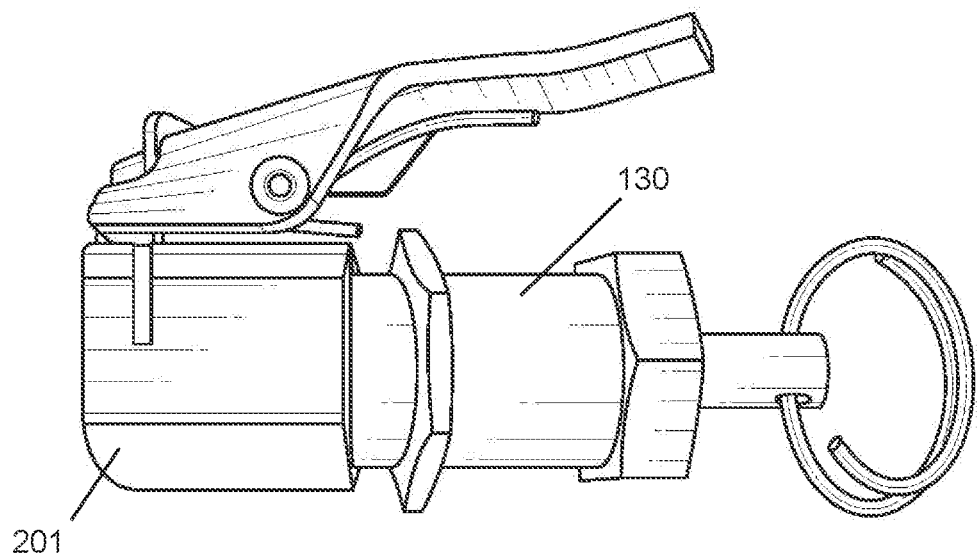
FIG. 15C

AUTOMATIC DEFLATOR VALVES WITH VORTEX-LIKE AIR FLOW WITH IMPROVED TIRE VALVE STEM CONNECTION

CROSS-REFERENCES TO RELATED APPLICATIONS

This application is a non-provisional and claims benefit of U.S. Provisional Application No. 63/231,162 filed Aug. 9, 2021, the specification(s) of which is/are incorporated herein in their entirety by reference.

FIELD OF THE INVENTION

The present invention relates to automatic deflator valves including, but not limited to, automatic deflator valves that have modified exhaust vents varying in number, size, shape and angles, that incorporate an O-ring around the piston, and that have input ports varying in number, size, shape and angles for quick, adjustable, accurate, and repeatable controlled deflation and automatic shut off pressure accuracy. The present invention also incorporates faster and easier valve stem attachment methods when used on standard tire valve stems.

BACKGROUND OF THE INVENTION

An automatic deflator valve is based on a spring-loaded pop valve that automatically turns on when a preset pressure is reached or exceeded and automatically turns off when the desired adjustable shut off pressure is reached. A desired pressure, also referred to herein as "destination pressure", is the pressure that a user chooses and adjusts to deflate down to. Referring to a sectioned tire deflator shown in FIG. 2A, while in the off position, the tire pressure is delivered through the input ports in the plate of the main body to a small area within/at the seating ring that is sealed against the seating pad at the bottom of the piston.

Automatic tire deflators may either automatically or manually be toggled on. Referring to a sectioned tire deflator shown in FIG. 2B, once toggled on, the air pressure then sees the body bore (also referred to herein as "piston cavity") and the larger area at the entire bottom of the piston. This air pressure times the entire piston bottom area produces a force that overcomes the spring force and maintains the piston in the on position until the pressure drops to the preset destination pressure. As the tire pressure drops, the spring force eventually overcomes the resultant air pressure force against the entire bottom of the piston area due to the decreased air pressure. This automatically toggles the deflator off, and the tire is at the desired destination pressure.

In the case of a compressor tank safety pop valve, it automatically turns on when the tank pressure exceeds a predetermined maximum. Neither the turn on or turn off pressure tolerances are as critical as with an automatic tire deflator used for setting off-road tire pressure. As used herein, compressor tank safety pop valves, pop valves and tire deflator valves may be referred to as deflators or deflator valves.

Referring to FIG. 2C, a sectioned tire deflator shown in the on position further identifies some of the more critical, tolerance-related leakage and exhaust paths. It shows that the air sees tolerance-related leakage paths (shown with dashed arrows) between the bore and the outside diameter of the piston. This air creates pressure within the spring chamber. The spring chamber in turn delivers air to unpredictable spring shaft-to-adjustment cap exhaust vents and unpredictable lock nut and adjustment cap-to-body thread exhaust vents. The exhaust rates will vary with tolerances and the relative mutual contact surface engagement relationships. These tolerance leakages also result in a backpressure force (indicated by a solid arrow) inside the spring cavity that adds to the spring force. This leads to less accurate, less repeatable and unreliable, undesirable, varying destination shut off pressures.

BRIEF SUMMARY OF THE INVENTION

It is an objective of the present invention to provide an improved deflator valve having faster deflation time, reduced noise, better accuracy, ease of adjusting the destination pressure, and reduced attachment and removal time with fewer attachment threads or lock chuck attachment methods.

In some aspects, the present invention features a deflator valve comprising a main body having a plate perpendicularly attached to an interior of the main body to divide the interior into a piston cavity and a valve stem cavity, one or more input ports disposed through the plate for fluidly connecting the valve stem cavity to the piston cavity, a depression pin projecting from the plate and into the valve stem cavity, and one or more vents disposed on the main body for relieving pressure from within the main body. In some embodiments, the one or more exhaust vents are perpendicular, skewed, or at various angles in the piston cavity. In other embodiments, the one or more exhaust vents are circular shaped, square shaped, slotted, or any other regular or irregular shape. In yet other embodiments, the one or more exhaust vents are of an irregular, non-rounded shape.

In some embodiments, the deflator valve also includes a piston movably disposed in the piston cavity. The piston can have a membrane pad disposed on an end of the piston facing the plate of the main body. In some embodiments, an O-ring may be disposed around an outer circumference of the piston. Preferably, the O-ring creates a seal that reduces or eliminates air leaks between the piston and the piston cavity. In some embodiments, the O-ring is not a perfect seal and acts like a partial seal. In other preferred embodiments, the O-ring can act as a cushion and reduce (or eliminate) vibration and/or deflation noise.

In some embodiments, a lock nut is threadably coupled onto the main body via threads disposed on a portion of an outer surface of the main body. An adjustment cap having a threaded inner surface mates with the outer threads of the main body to cap the piston cavity. The area between the inside of the adjustment cap and above the plate is the spring chamber. The deflator valve further comprises a spring shaft coupled to the adjustment cap and disposed in a shaft cavity within the piston such that a shaft tip rests upon a shaft seat in the piston. A spring is wrapped around the shaft and a first end of the spring sits in an adjustment cap spring seat and a second end of the spring sits in a shaft spring seat near the shaft tip. The spring is thus compressed between the adjustment cap spring seat and the shaft spring seat. The adjustment cap is threadably positioned on the main body to compress, or decompress the spring and achieve a desired force setting which results in a desired destination pressure. Once the adjustment cap is set to the desired deflation pressure, the lock nut is threaded so as to abut against the adjustment cap and lock or set it in place.

The unique and inventive technical features of the present invention include the O-ring of the piston and the skewed, slotted, or irregularly shaped exhaust vents and input ports. Without wishing to limit the invention to any theory or mechanism, it is believed that the technical features of the present invention advantageously results in noise reduction and ease, accuracy of setting pressure adjustments, a more accurate and repeatable destination pressure and reduced deflation time of the deflator valve. None of the presently known prior references have these unique inventive technical features of the present invention.

In one embodiment, the deflator valve comprises one or more springs. In another embodiment, the deflator valve comprises a single, dual or variable rate spring. In some embodiments, the spring can achieve a desired destination pressure setting that can be any pressure. As a non-limiting example, the destination pressure can be in the range of 1 to 65 psi. Without wishing to limit the invention to any theory or mechanism, the dual or variable rate spring can also reduce noise, increase ease of setting the pressure adjustment, reduce deflation time, and increase accuracy and repeatability of the deflator valve.

In some embodiments, the deflator valve of the present invention may have a reduced number of stem cavity threads, as compared to those of prior deflator valves, to lessen the attach and detach time. In another embodiment, the deflator has a threadless lead-in to pre-align thread engagement.

In other embodiments, the deflator valve has a lock chuck to further reduce and simplify deflator attach and detach times to one simple action versus traditional multiple twisting for threaded attach and detach method. The lock chuck securing pawl engages the valve stem threads allowing the lock chuck to be slightly turned clockwise to ensure a tighter, firmer seal between the valve stem and the lock chuck.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 1B shows a cross-sectional view of the deflator valve of the present invention in the off position and incorporating an O-ring around the piston.

FIG. 1C shows a cross-sectional view of the deflator valve of the present invention in the on position where the O-ring around the piston prevents tolerance air leakage into the spring chamber.

FIG. 15A shows an embodiment of the deflator valve with a lock chuck attachment mechanism.

FIG. 15B shows a locking pawl of the lock chuck.

FIG. 15C shows a side view of the deflator valve with a lock chuck attachment mechanism.

DETAILED DESCRIPTION OF THE INVENTION

Figure 1A:
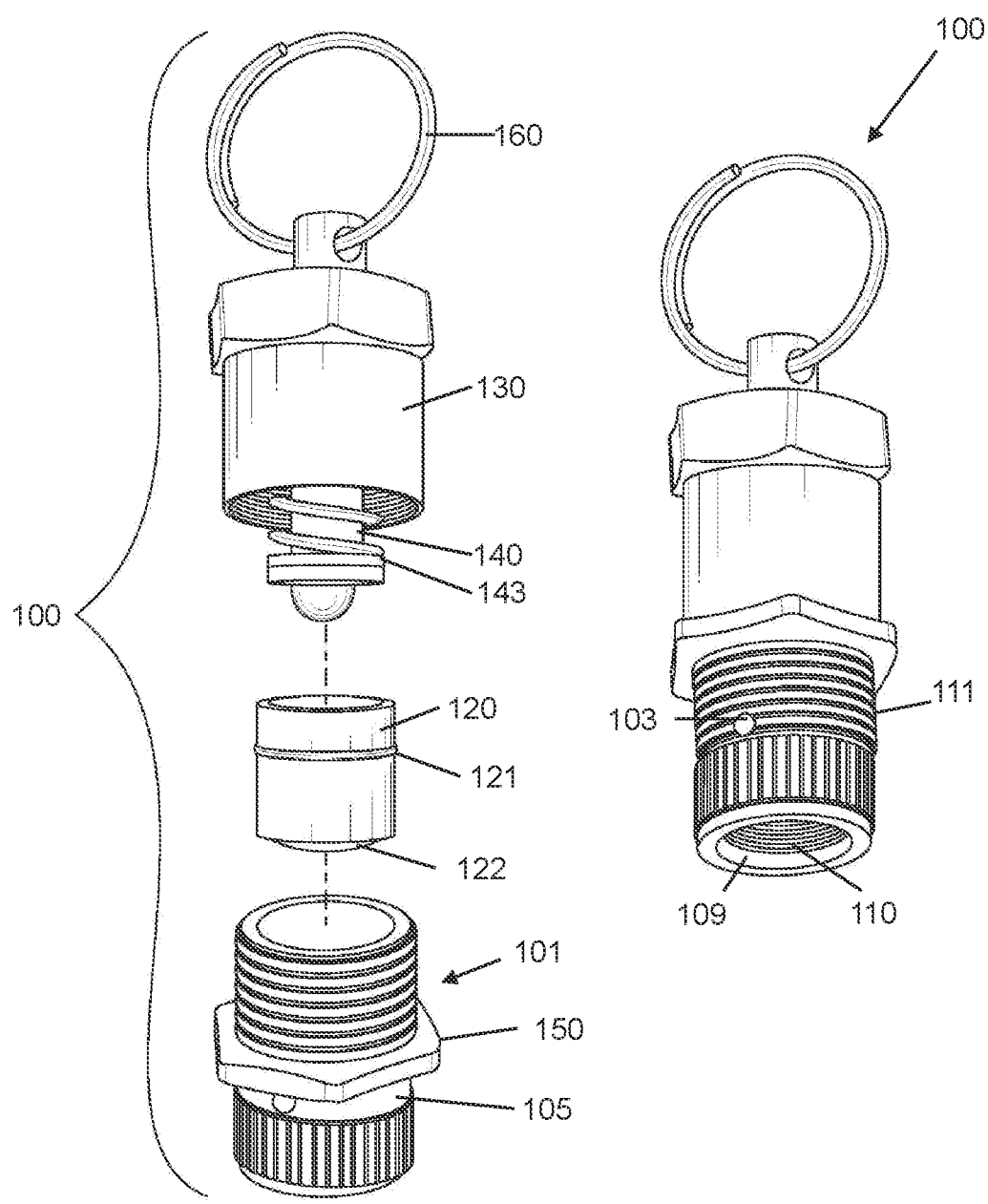
FIG. 1A shows an exploded view and an assembled view of a deflator valve according to an embodiment of the present invention.

Following is a list of elements corresponding to a particular element referred to herein:

100 screw on deflator valve
101 main body 102 input port(s)
103 exhaust vent(s)
104 plate
105 sidewall
106 piston cavity
107 valve stem cavity
108 depression pin
109 threadless lead in
110 stem cavity threads
111 adjustment threads
112 valve stem O-ring
113 seating ring
120 piston
121 piston O-ring
122 membrane pad
123 membrane pad indent
124 shaft cavity
125 shaft seat
130 adjustment cap
131 spring chamber
132 reference mark
133 adjustment cap spring seat
140 spring shaft
141 shaft tip
142 shaft spring seat
143 spring
150 lock nut
160 start ring
170 body axis
171 port axis
172 vent axis
200 lock chuck deflator valve
201 lock chuck
202 pawl
300 valve stem
301 valve stem core According to some embodiments, the present invention features a deflator valve for reducing deflation time. Referring to FIG. 1, in one embodiment, the deflator valve can be a screw on deflator valve (100). Referring to FIG. 15A, in another embodiment, the deflator valve can be a lock chuck deflator valve (200).

In some embodiments, the deflator valve may be used for deflating a pressurized vessel. For example, the deflator valve may be used in conjunction with a valve having a valve stem (300) for deflating a tire. Other applications of the deflator valve include, but are not limited to, automated systems requiring pressure relief, pressure safety control systems, OEM equipment, and pressure vessel protection.

In some embodiments, the deflator valve may comprise a main body (101) having a plate (104) disposed within the main body (101) to divide an interior into a piston cavity (106) and a valve stem cavity (107), one or more input ports (102) disposed through the plate (104) for fluidly connecting the valve stem cavity (107) to the piston cavity (106), and one or more exhaust vents (103) disposed through a sidewall (105) of the main body in the piston cavity (106) for relieving pressure from within the main body. In some preferred embodiments, the one or more input ports (102) are skewed such that for an entrance and an exit of each input port are offset from one another. In other preferred embodiments, the one or more exhaust vents (103) are skewed such that an entrance and an exit of each exhaust vent are offset from one another.

As used herein, the term "vent" refers to an exhaust where air comes out or exits the deflator. The vent can be a hole, opening, port, output or orifice. The vent can have various shapes and is not limited to a circular hole. For example, the vent can be a slot. The vent can be machined into the main body (101) by drilling, punching, cutting, milling or casting.

Referring now to FIGS. 4-7, the plate (104) may include a depression pin (108) projecting from the plate (104) and into the valve stem cavity (107). In other embodiments, the plate (104) further includes a seating ring (113) disposed thereon and facing the piston cavity (106). In some embodiments, the main body (101) further comprises adjustment threads (111) disposed exterior to the piston cavity (106). In some embodiments, the deflator valve may further comprise a valve stem O-ring (112) disposed within the valve stem cavity (107) and adjacent to the plate (104).

In some embodiments, the main body (101) further comprises a threadless lead in (109) that transitions to stem cavity threads (110) disposed within the valve stem cavity (107). In alternative embodiments, as shown in FIG. 15B, the deflator valve may further comprise a pawl (202) operatively coupled to the main body (101) and disposed through the valve stem cavity (107).

According to a non-limiting embodiment, as shown in FIG. 1A, the present invention features a deflator valve for reducing noise and deflation time and improving accuracy and ease of adjusting a pressure setting. The deflator valve may be configured to be removably attached to a valve stem (300) of a pressure vessel for deflating the pressure vessel to the desired pressure.

In one embodiment, the deflator valve may comprise a main body (101), a piston (120), a lock nut (150), an adjustment cap (130), a spring shaft (140), and a spring (143). In some embodiments, the main body (101) may comprise a plate (104) perpendicularly disposed within the main body (101) to divide an interior into a piston cavity (106) and a valve stem cavity (107), one or more input ports (102) disposed through the plate (104) for fluidly connecting the valve stem cavity (107) to the piston cavity (106), one or more exhaust vents (103) disposed through a sidewall (105) of the main body in the piston cavity (106) for relieving pressure from within the main body, a depression pin (108) projecting from the plate (104) and into the valve stem cavity (107), a seating ring (113) projecting from the plate (104) and facing the piston cavity (106), and adjustment threads (111) disposed exterior to the piston cavity (106). For example, the adjustment threads (111) may be disposed on a portion of the outer surface of the main body.

In some embodiments, the one or more input ports (102) are skewed such that for an entrance and an exit of each input port are offset from one another. In other embodiments, the one or more exhaust vents (103) are skewed such that an entrance and an exit of each exhaust vent are offset from one another.

In some embodiments, the piston (120) is movably disposed in the piston cavity (106). The piston (120) may comprise a piston O-ring (121) disposed around an outer circumference of the piston, a membrane pad (122) disposed on an end of the piston facing the plate (104) and abutting against the seating ring (113), and a shaft cavity (124). Without wishing to limit the present invention to a particular theory or mechanism, the piston O-ring (121) creates a seal that reduces or eliminates air leaks between the piston (120) and the piston cavity (106).

In one embodiment, the membrane pad (122) may be secured to the piston (120) by a force fit. In another embodiment, the membrane pad (122) may be secured to the piston (120) by an adhesive. In some embodiments, the membrane pad (122) can have a membrane pad indent (123) configured to receive or mate with the seating ring (113). In some embodiments, the piston is disposed in the piston cavity such that the membrane pad (122) is facing the plate. The opposing end of the piston is open for receiving the spring shaft.

In some embodiments, the spring shaft is configured to be disposed through the spring and in the shaft cavity (124) within the piston. Referring to FIG. 1B, for example, the spring shaft (140) has a shaft tip (141) configured to be disposed in the shaft cavity (124) such that the shaft tip (141) rests upon a shaft seat (125) in the piston (120). The spring (143) may be wrapped around the spring shaft (140). A first end of the spring is configured to sit in an adjustment cap spring seat (133) and a second end of the spring is configured to sit in a shaft spring seat (142).

In some embodiments, the spring shaft (140) is coupled to the adjustment cap (130). The adjustment cap (130) covers or caps the piston cavity (106) as well as the shaft cavity (124) within the piston. The adjustment cap (130) is threadably coupled to the main body (101) via adjustment threads (111). For example, the adjustment cap may have a threaded inner surface for mating with the adjustment threads (111) of the main body. In other embodiments, a lock nut (150) is threadably coupled to the main body (101) via the adjustment threads (111).

When assembled, the piston (120) is disposed in the piston cavity (106) of the main body. The membrane pad (122) faces the plate and abuts against the seating ring (113). The shaft tip (141) is inserted into the shaft cavity (124) of the piston and rests upon the shaft seat (125). The adjustment cap (130) is threaded onto the main body (101), which causes the spring (143) to be compressed or decompressed between and by the adjustment cap spring seat (133) and the shaft spring seat (142) until the adjustment cap (130) is at a position that achieves the desired spring force setting. After the adjustment cap (130) is set to the desired pressure setting, the lock nut (150) is threaded along the main body (101) until it abuts against the adjustment cap (130) to lock the adjustment cap in place and secure the adjustment cap position.

Without wishing to limit the present invention to a particular theory or mechanism, the spring (143) is configured to reduce noise and ease setting of the desired pressure. In some embodiments, the spring (143) comprises two individual springs. In one embodiment, each spring can have a different spring rate. In other embodiments, the spring (143) is a single, dual rate spring. In some other embodiments, the spring (143) is a single, variable rate spring. In some embodiments, the spring is configured to achieve a desired pressure setting that can be any pressure. As a non-limiting example, the destination pressure can be in the range of 1 to 65 psi.

Figure 12:
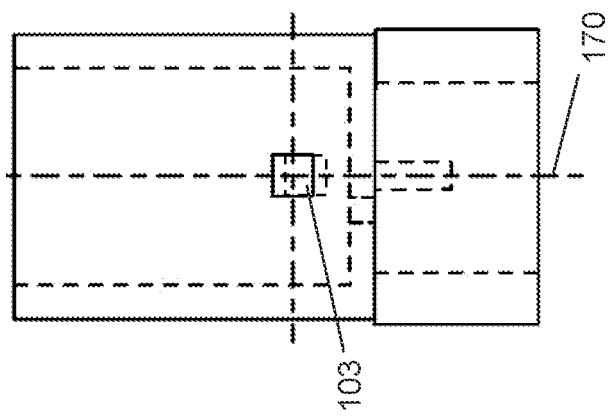
FIG. 12 shows a simplified top view of a deflator valve with a representative skewed input port and skewed exhaust vent. A vortex, circular flow (path shown in dashed lines) introduced by the skewed input port and exiting at the skewed vent results in improved performance.

Again, without wishing to limit the present invention to a particular theory or mechanism, the one or more input ports (102) and the one or more exhaust vents (103) are configured to introduce air into and relieve pressure from within the main body (101) in a vortex, circular flow as shown in FIG. 12.

In some embodiments, the deflator valve may further comprise a valve stem O-ring (112) disposed within the valve stem cavity (107) and abutting the plate (104).

Figure 7:
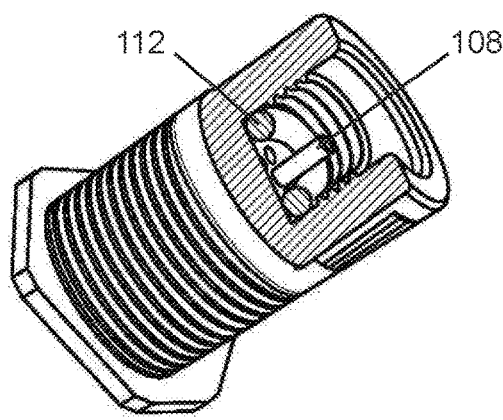
FIG. 7 is a cut away view of the valve stem cavity of the deflator valve, which shows the threadless lead-in that transitions to stem cavity threads, a depression pin, and a valve stem O-ring.

In one embodiment, as shown in FIG. 7, the main body (101) may further comprise an attachment mechanism comprising a threadless lead in (109) and stem cavity threads (110) disposed within the valve stem cavity (107). The stem cavity threads (110) are disposed between the threadless lead in (109) and the valve stem O-ring (112).

In an alternative embodiment, as shown in FIG. 15B, the deflator valve may include an attachment mechanism comprising a pawl (202) operatively coupled to the main body (101) and disposed through the valve stem cavity (107).

Figure 8:
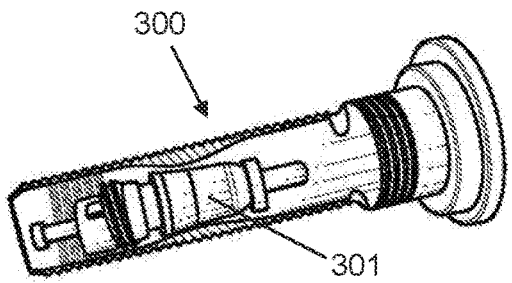
FIG. 8 shows an example of a valve stem core, which threads into a valve stem.

In some embodiments, the threadless lead in and stem cavity threads (110) or the lock chuck with pawl is configured to receive a valve stem (300). FIG. 8 shows a non-limiting embodiment of a valve stem (300) having a valve stem core (301). The depression pin (108) is configured to press against the valve stem core (301), thus activating deflation. Without wishing to limit the present invention to a particular theory or mechanism, the attachment mechanism can reduce attach and detach times, whether it is the threadless lead in and fewer threads, or the lock chuck with pawl.

In further embodiments, the deflator valve may include a manual start ring (160) attached to a terminal end of the spring shaft that is disposed through the adjustment cap (130). The manual start ring (160) may be used to initiate the deflation process. Pulling the manual start ring (160) pulls the spring shaft (140) away from the piston (120), which causes the piston (120) to slide and lift the membrane pad (122) away from the seating ring (113). This allows for air to push against the membrane pad (122) with less resistance, and keep the piston up and in the on position. While pulling the manual start ring (160) increases the spring force between the adjustment cap and piston, this also has the effect of reducing the force on the piston. The incoming air from the input ports (102) has more area to push against, thereby keeping the piston up and the deflator on.

In the off position versus high and low destination pressures, the off/on pressure ratio should be a constant. Since the off/on areas do not change, the hardness and material of the membrane pad (122), and/or the depth of the membrane pad indent (123) into the membrane pad may subtly change the off area and affect this ratio. Thus, the hardness and material of the membrane pad (122), and/or the depth of the membrane pad indent (123) is selected and/or tuned so as to keep the ratio constant or predictable. In other embodiments, the design of the seating ring (113) may also influence the membrane pad indent (123).

An exemplary embodiment of utilizing the deflator valve with a tire is described as follows. When in use, the tip of the tire valve stem is inserted into the deflator valve stem cavity such that the depression pin pushes the button on the valve core to release air. FIGS. 1B-1C show how the deflator valve works to lift the piston and deflate air from the tire. It is lifted by the air pressure delivered to the deflator through the input ports. In pop valves and tire deflators, the valve toggles off when the air pressure times the piston's total circular area is overcome by the spring force.

Increased deflation speed results in minimum deflation time to reach the destination pressure. Compressor tank pop valves have one giant exhaust vent. With this approach, the valve typically makes noise and results in unreliable shut off pressure repeatability and accuracy. The noise may be a humming, whistling, buzzing, melodic, vibrating-like sound. The noise may be indicative of undesirable, toggle OFF problems and/or performance problems. For example, noise usually indicates a vibrating piston, which means that the spring is being abnormally compressed and decompressed. The changing compression means less accurate shut OFF pressure. There is a need and desire in the off-road community for quiet, accurate, easy to use deflators.

Without wishing to limit the invention to a particular theory or mechanism, the O-ring on the piston seals or partially seals the piston cavity 360° thereby eliminating or significantly reducing piston-bore leakage. This in turn makes the spring shaft to adjustment cap tolerances of little or no importance. This cumulatively results in simplified destination pressure adjustment due to a predictable adjustment rate solely dependent on the spring rate with lesser influence of the adjustment cap to spring shaft and other tolerance leakage paths. An additional benefit of the O-ring is that it eliminates undesirable noise. The inventor surprisingly found that when the O-ring was implemented in the deflator valve, the O-ring on the piston cured the noise problem and also benefited the set pressure adjustment process and accuracy.

Traditional exhaust vents of both automatic tire deflators and overpressure pop valves use a single round exhaust hole with no exceptions. The vent is round and always drilled perpendicular to the body axis. Furthermore, deflator valves do not have multiple vents. Adding multiple, conventional exhaust vents was found to not significantly reduce deflation time. This may be caused by the air flow having to make abrupt changes in direction after leaving the input ports, which creates eddies that disrupt and slow the exhausting air.

Figure 2C:
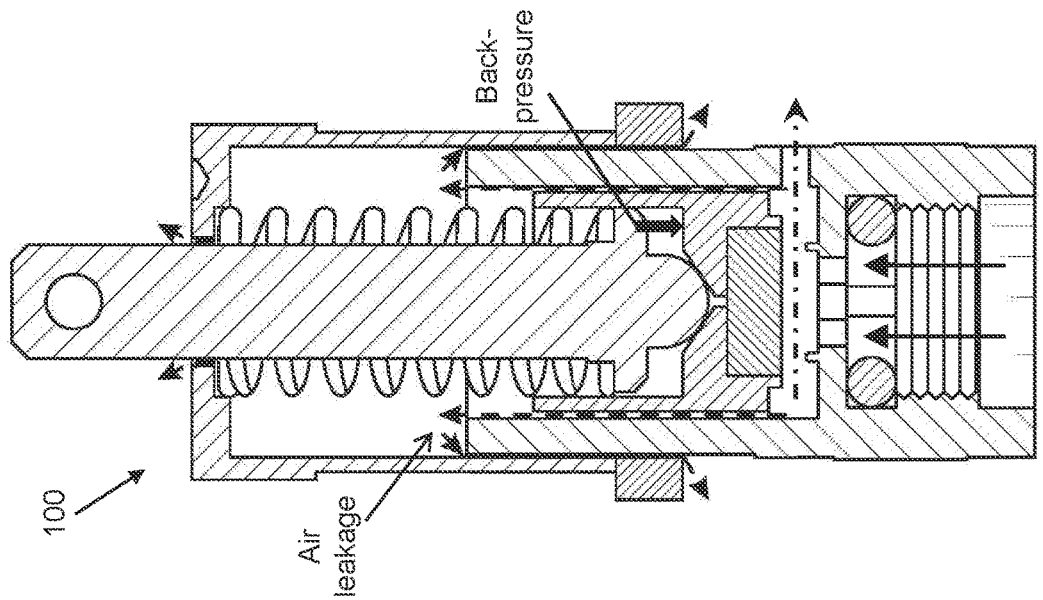
FIG. 2C is a cross-sectional view of the prior deflator valve in the on position with air leaking paths shown in dashed arrows.
Figure 2B:
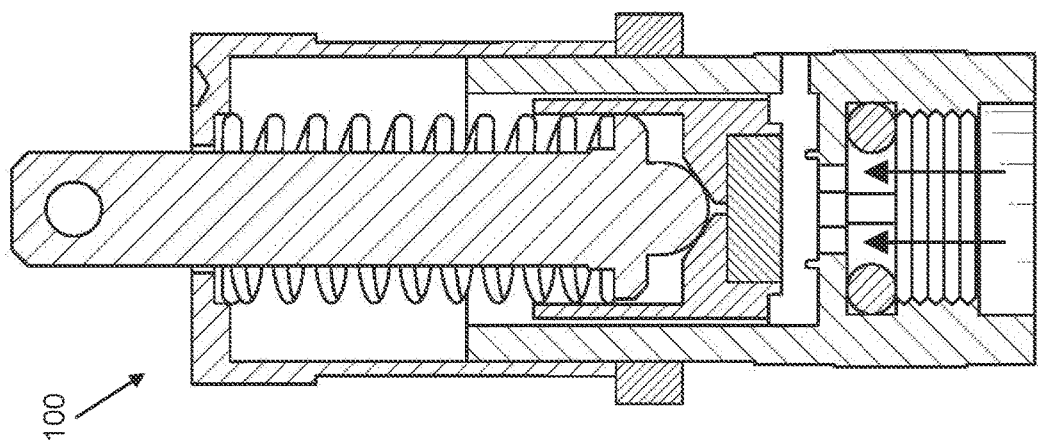
FIG. 2B shows a cross-sectional view of the prior deflator valve in the on position.
Figure 2A:
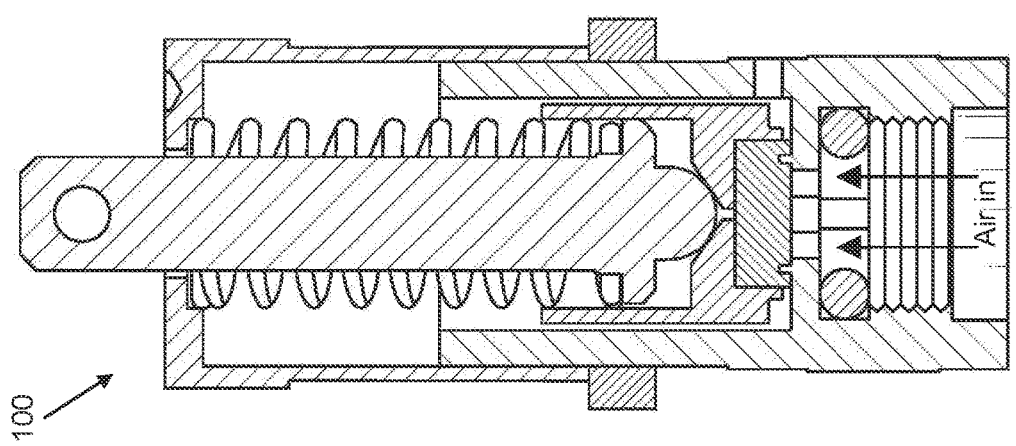
FIG. 2A shows a cross-sectional view of a prior deflator valve in the off position.
Figure 3:
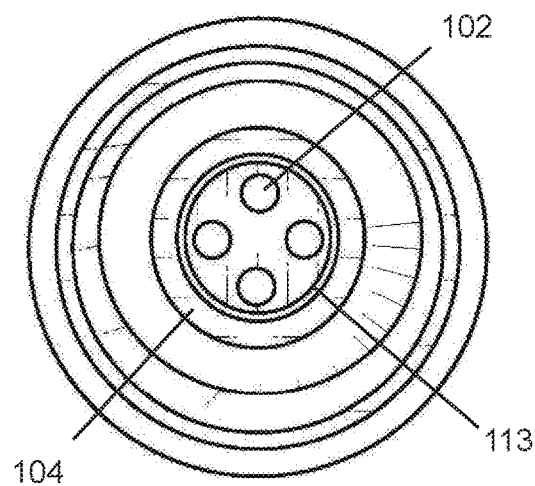
FIG. 3 shows an interior view of a main body of the deflator valve.
Figure 4:
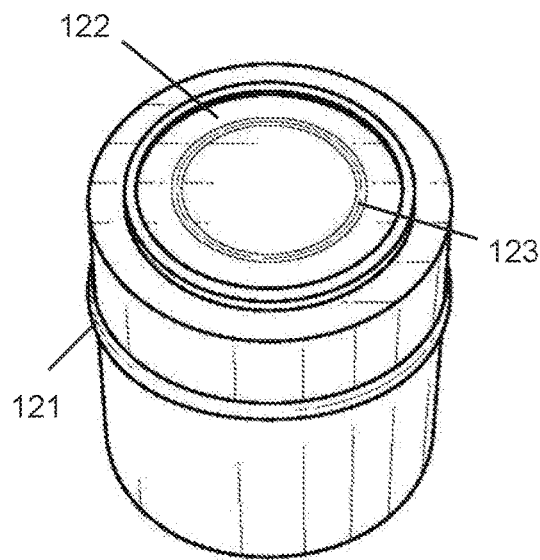
FIG. 4 shows a piston of the deflator valve that includes an O-ring disposed around the piston, and a membrane pad having a membrane indent.
Figure 5:
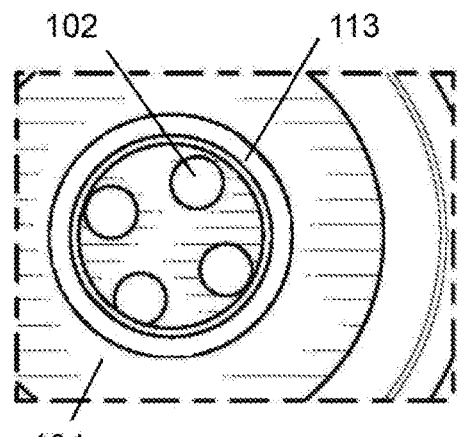
FIG. 5 is a zoomed-in view of input ports in the main body of the deflator valve. The input ports may be in an asymmetrical layout relative to a seating ring of the plate, or alternatively, the input ports may be close to or perfectly centered.
Figure 6:
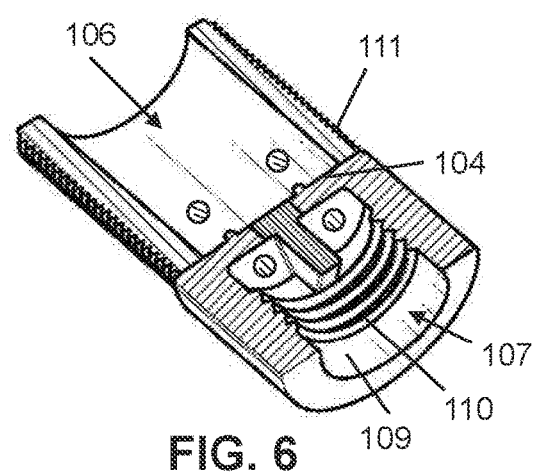
FIG. 6 shows a cross-sectional view of the main body of the deflator valve having a threadless lead-in that transitions to stem cavity threads. The threadless lead-in simplifies starting a deflator on a valve stem.

FIG. 2A-2C shows prior deflator valves in the off and on piston positions, tolerance leakage paths and how tolerance air leakage influences performance. FIG. 2A shows a cross-sectional view of a prior deflator valve in the off position. Air comes up through the input ports and pushes against the area confined within the seating ring at the piston seating pad as indicated by the arrows. This produces a force that is the seating ring area times the input tire pressure. In the off position, the input pressure times the seating ring area force is not sufficient to overcome the spring force holding the deflator in the off position.

FIG. 2B shows a cross-sectional view of the prior deflator valve in the on position due to the force of the input port air pressure times the total area of the bottom of the piston being greater than the spring force. FIG. 2C shows the prior deflator valve in the on position with air leaking at the body-to-bore tolerance and exhausting at the adjustment cap to spring shaft tolerance and the body to lock nut and adjustment cap thread paths shown by dashed arrows, whereas the venting air is shown with dashed-dot arrows. This tolerance leakage also results in a backpressure force (solid arrow) inside the shaft cavity of the piston that adds to the spring force. As the related tolerances vary, so varies the backpressure force and hence the deflator's adjustment rate, destination pressure repeatability, and accuracy. This introduces undesirable, destination shut off pressure repeatability errors due to varying tolerances and inter-part positioning relationships.

Referring to FIG. 1B, the deflator valve of the present invention in the on position incorporates an O-ring (121) around the piston. As illustrated in FIG. 1C, the O-ring (121) around the piston can prevent tolerance air leakage into the spring chamber. Without wishing to limit the present invention to a particular theory or mechanism, this embodiment eliminates all tolerance-related leakage paths that result in additional force on the shaft seat (125) and associated exhaust paths. Eliminating this additional force and tolerance related leakage paths result in easier, more accurate and repeatable destination pressure adjustment settings.

As previously discussed, the one or more input ports (102) and/or the one or more vents (103) may be skewed to produce the vortex-like air flow. Without wishing to be bound to a particular theory, this vortex-like air flow can result in faster deflation times and more efficient deflation.

Various embodiments of the one or more input ports (102) and the one or more vents (103) are shown in FIGS. 9A-9D and FIGS. 10A-10E. The different concepts are presented in said figures using a simplified deflator for ease of review. These figures show non-limiting examples of the input port and exhaust vent configurations. It is to be understood that said examples are not intended to limit the present invention in any way. Equivalents or substitutes are within the scope of the present invention.

In accordance with the present invention, the shapes, sizes, arrangement, and location of the vents and ports can vary. In some embodiments, the vent angles relative to the sidewall, and the port angles relative to the plate can also vary.

Without wishing to limit the invention to a particular theory or mechanism, the one or more ports and vents of the deflator valve of the present invention can result in a vortex-like air flow in and out of the deflator as shown by the dash-dot lines in FIG. 12. In some preferred embodiments, the skewed vents of the present invention are effective for making the exhaust air flow smoother and faster out of the deflator. For some implementations of the present invention, it was surprisingly found that the deflator valves reduced the deflation time by at least 30% compared to conventional vents.

According to some embodiments, as shown in FIGS. 9A-9D, the deflator valve can have one or more ports (102) that are straight, skewed, or diagonal. As used herein, skewed and diagonal refers to not being perpendicular to the plate. This means that the entrance of the port and the exit of the port are not directly aligned. In other words, the port axis (171) is not parallel to the body axis (170).

Figure 9A:
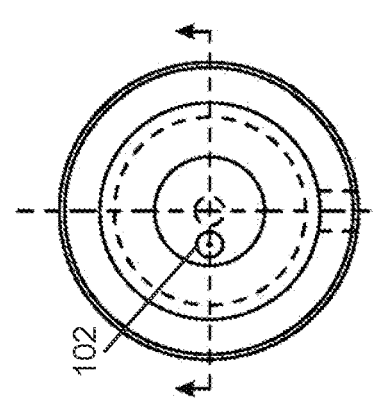
FIG. 9A shows a top and a cross-sectional view of a straight port according to an embodiment of the present invention.
Figure 9A:
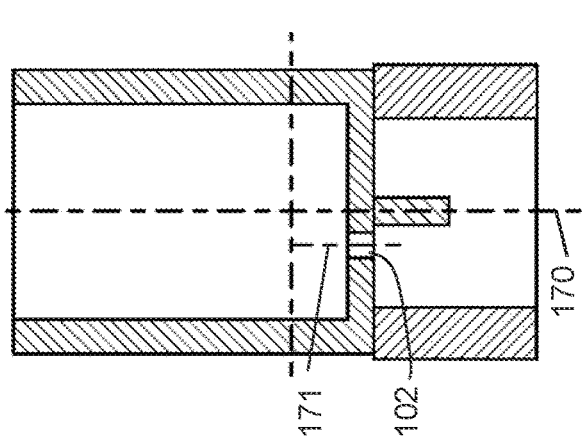

FIG. 9A shows an embodiment of a straight port. The body axis (170) and the port axis (171) are in one plane. The body and port axes are parallel and do not intersect.

Figure 9B:
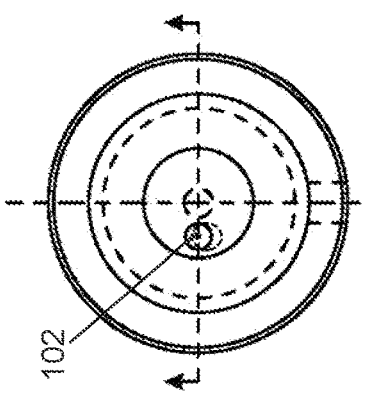
FIG. 9B shows a top and a cross-sectional view of a skewed port according to an embodiment of the present invention.
Figure 9B:
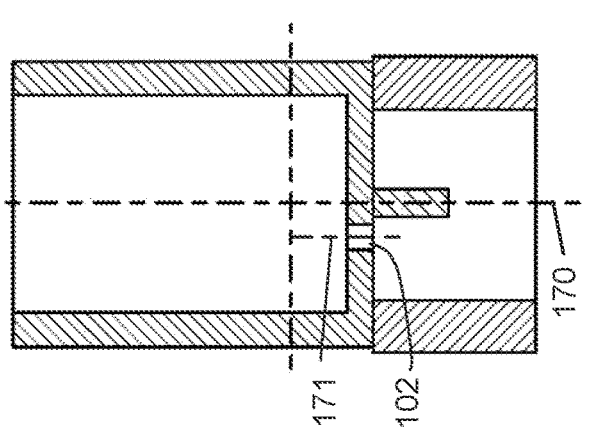
Figure 9C:
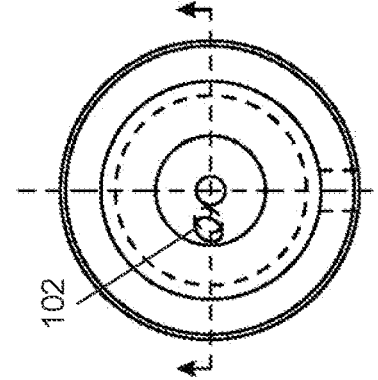
FIG. 9C shows a top and a cross-sectional view of a diagonal port according to an embodiment of the present invention.
Figure 9C:
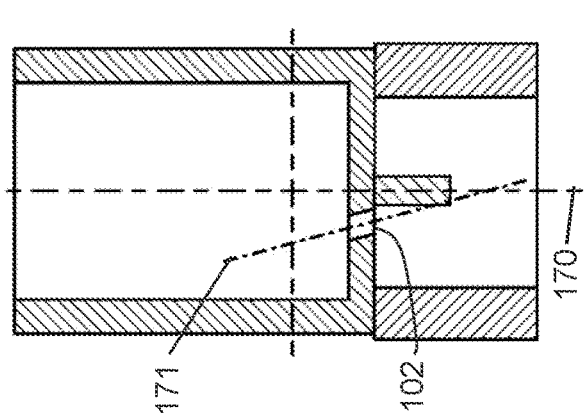
Figure 9D:
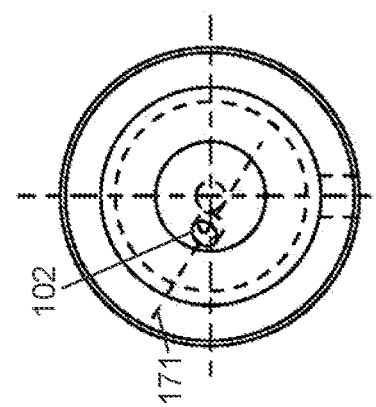
FIG. 9D shows a top and a cross-sectional view of another embodiment of a skewed port.
Figure 9D:
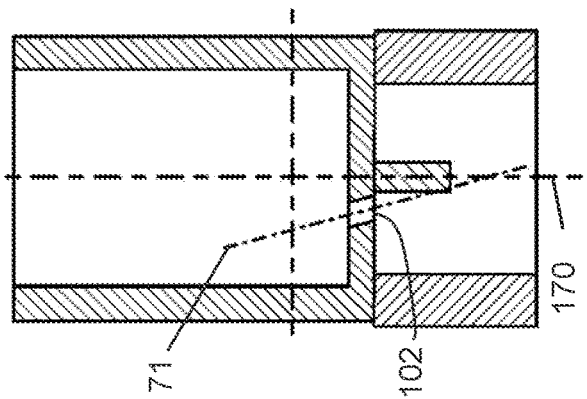

FIGS. 9B and 9D show embodiments of skewed ports. The body and port axes are in independent planes. The body and port axes do not intersect.

FIG. 9C shows an embodiment of a diagonal port. The body and port axes are in independent planes. The intersection of the body and port axes can vary.

According to some embodiments, as shown in FIGS. 10A-10E, the deflator valve can have one or more vents (103) that are straight thru, skewed, diagonal, or offset from center. As used herein, skewed refers to not being perpendicular to the sidewall. This means that the entrance of the vent and the exit of the vent are not directly aligned. Offset from center refers to the vent in which the vent axis (172) is normal to the body axis (170), but the vent axis (172) does not intersect the body axis (170).

Figure 10C:
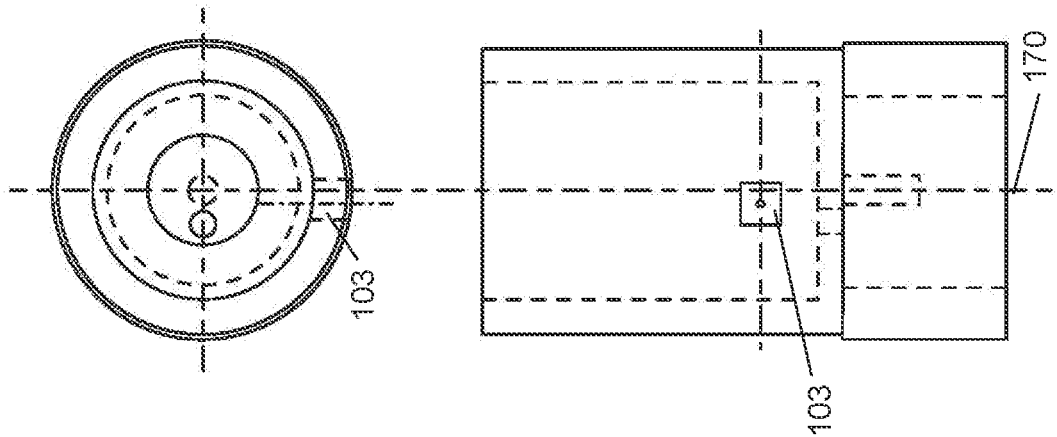
FIG. 10C shows a top and a side view of an offset vent according to an embodiment of the present invention.
Figure 10B:
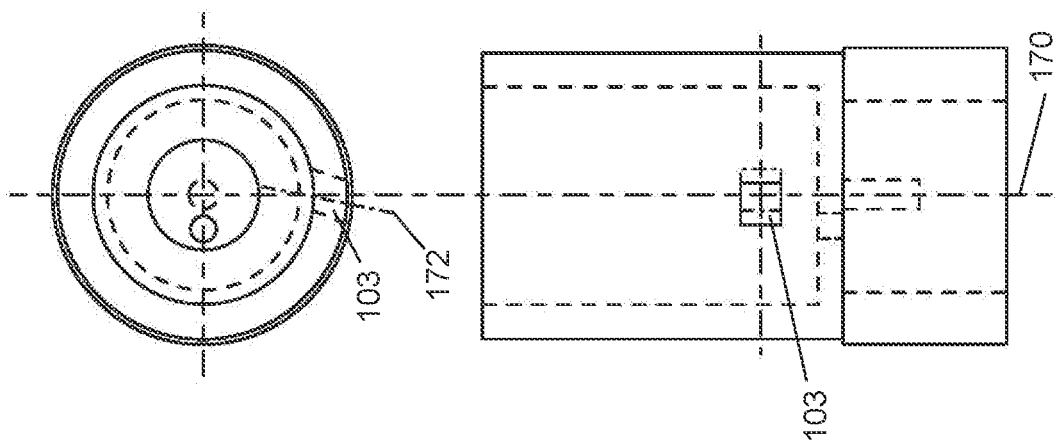
FIG. 10B shows a top and a side view of a skewed vent according to an embodiment of the present invention.
Figure 10A:
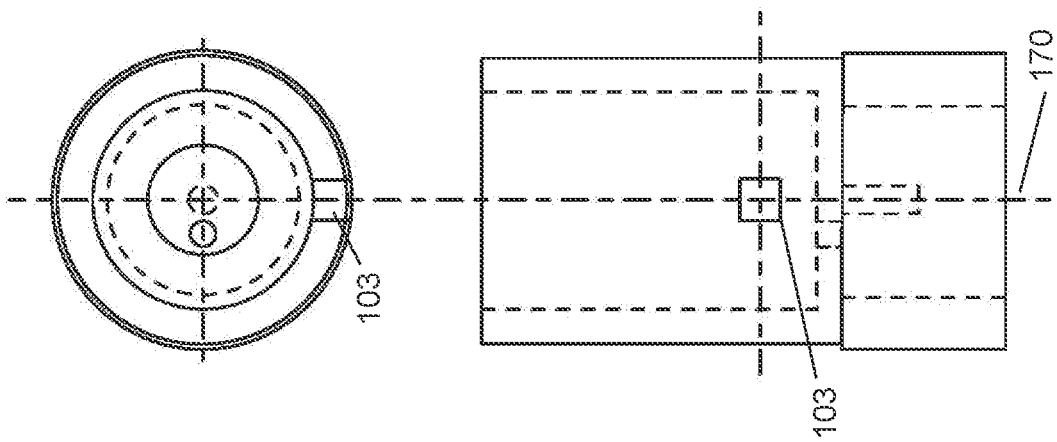
FIG. 10A shows a top and a side view of a straight thru vent according to an embodiment of the present invention.
Figure 11:
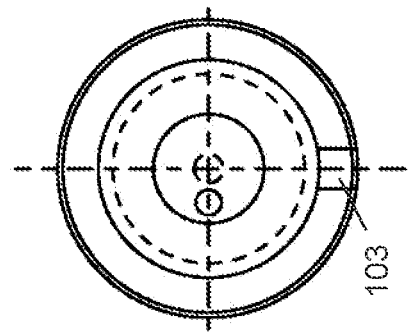
FIG. 11 is a zoomed-in side view of vents in the main body of the deflator valve.

FIG. 10A shows an embodiment of a straight thru vent. The entrance of the vent and the exit of the vent are directly aligned. The body and vent axes intersect at a right angle.

FIG. 10C shows an embodiment of an offset from center vent. The entrance of the vent and the exit of the vent are directly aligned. The body and vent axes are perpendicular and never intersect.

Figure 10E:
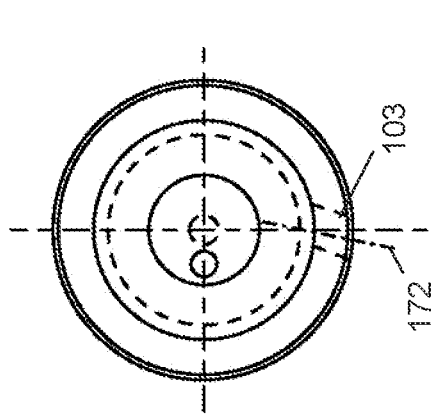
FIG. 10E shows a top and a side view of a diagonal skewed vent according to an embodiment of the present invention.

FIGS. 10B and 10E show embodiments of a skewed vent. The entrance of the vent and the exit of the vent are not directly aligned. The body and vent axes are not perpendicular and never intersect.

Figure 10D:
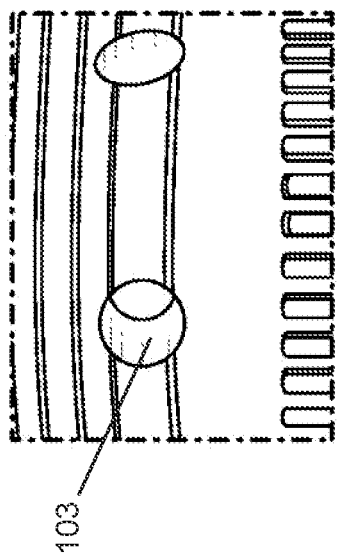
FIG. 10D shows a top and a side view of another embodiment of a diagonal vent.

FIG. 10D shows an embodiment of a diagonal vent. The entrance of the vent and the exit of the vent are not directly aligned. The body and vent axes intersect at random angles, and may intersect at other angles.

In some preferred embodiments, the configuration of the vents and ports may result in faster deflation as compared to previous deflator valves. In some embodiments, the various configurations of the vents and ports may be combined to achieve numerous combinations as long as the combination can cause air to flow in a vortex, circular flow. In alternative embodiments, the configuration of the vents and ports may result in air flowing in a non-circular path.

In one embodiment, the one or more vents (103) may be in diagonal vents and the one or more ports (102) are diagonal ports. In another embodiment, the one or more vents (103) may be in diagonal vents and the one or more ports (102) are straight ports. In yet another embodiment, the one or more vents (103) may be in diagonal vents and the one or more ports (102) are skewed ports.

In another example, the one or more vents (103) may be in skewed vents and the one or more ports (102) are skewed ports. In another embodiment, the one or more vents (103) may be in skewed vents and the one or more ports (102) are straight ports. In another embodiment, the one or more vents (103) may be in skewed vents and the one or more ports (102) are diagonal ports.

In another example, the one or more vents (103) may be in offset vents and the one or more ports (102) are skewed ports. In another embodiment, the one or more vents (103) may be in offset vents and the one or more ports (102) are straight ports. In another embodiment, the one or more vents (103) may be in offset vents and the one or more ports (102) are diagonal ports.

In another example, the one or more vents (103) may be in straight thru vents and the one or more ports (102) are skewed ports. In another embodiment, the one or more vents (103) may be in straight thru vents and the one or more ports (102) are straight ports. In another embodiment, the one or more vents (103) may be in straight thru and the one or more ports (102) are diagonal ports.

Figure 13:
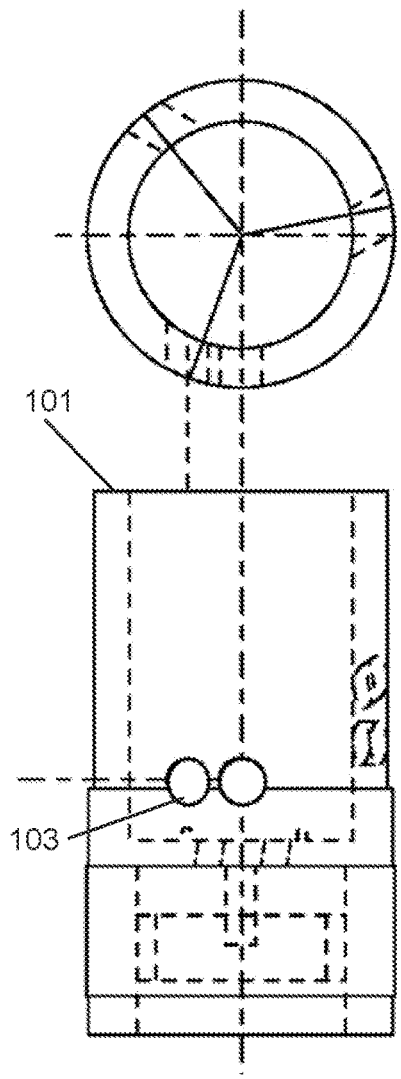
FIG. 13 shows a top and a side view of various embodiments of the vents.

As shown in the top view of FIG. 13, a conventional vent intersects the main body perpendicular to the body axis. In some embodiments, the vents of the present invention are angled relative to a radius of the main body, whereas previous vents are in line with the radius. The vents are skewed such that the vents have a positive slope, meaning that the vents are skewed in the direction of airflow. In yet other embodiments, the vents are skewed both radially and in the direction of airflow. The skewed vents are shown intersecting and offset to one (either) side of the conventional vent. They may be either perpendicular or at an angle to the body axis.

In some embodiments, the number of vents can range from 1 to 10. In some embodiments, the one or more vents (103) can vary in size and shape. For example, the deflator valve can have vents (103) that are slotted or circular. For instance, the one or more exhaust vents (103) may be circular shaped, square shaped, slotted, or any other regular or irregular shape.

In other embodiments, the vent location relative to the seating ring in the main body may affect the vortex venting. In some embodiments, the vents may all be positioned the same distance away from the seating ring. Alternatively, the vents may be positioned at varying distances away from the seating ring. For example, the deflator valve may have two diametrically opposed vents at one distance away from the seating ring and another two diametrically opposed vents at another distance away from the seating ring. For example, vents at 0° and 180° may be about 0.1 mm away from the seating ring and vents at 90° and 270° may be about 0.2 mm away from the seating ring. The vents can intersect the sidewall of the main body at various angles and directions.

Figure 14A:
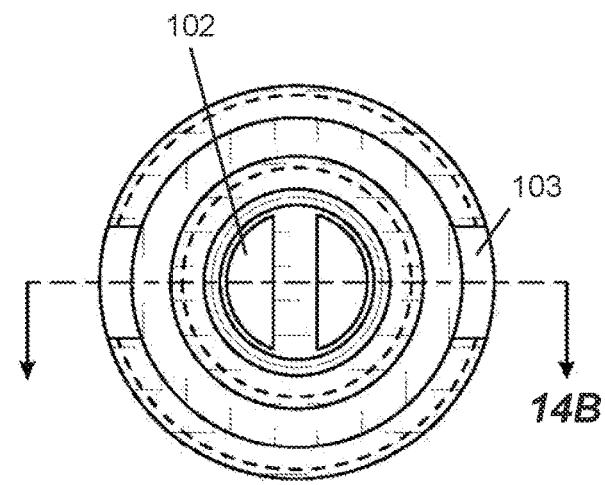
FIGS. 14A and 14B show a top and a cross-sectional view of an alternative embodiment of the input ports and exhaust vents.
Figure 14B:
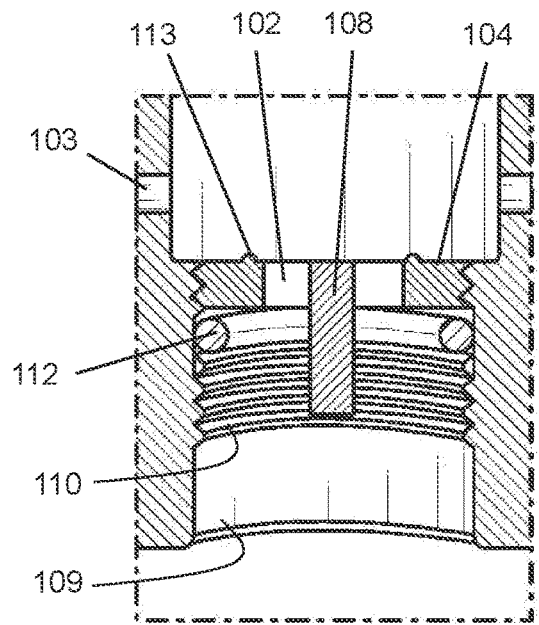

In some embodiments, the number of input ports may range from 1 to 6. In some embodiments, the one or more input ports (102) may be any size and shape. For example, the one or more input ports (102) may be circular shaped, semi-circular shaped, or square shaped. As shown in FIG. 14A-14B, a non-limiting embodiment of the input ports may be two semi-circular input ports instead of four circular input ports. The ports can intersect the plate at various angles and directions. In some embodiments, the spacing between the ports (102) and the depression pin (108) can vary. The spacing may be the same for each port or the spacing may vary.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A deflator valve for reducing deflation time, comprising a main body (101) having:
    a) a plate (104) disposed within the main body (101) to divide an interior into a piston cavity (106) and a valve stem cavity (107);
    b) one or more input ports (102) disposed through the plate (104) for fluidly connecting the valve stem cavity (107) to the piston cavity (106), wherein the one or more input ports (102) are skewed such that for an entrance and an exit of each input port are offset from one another; and
    c) one or more exhaust vents (103) disposed through a sidewall (105) of the main body in the piston cavity (106) for relieving pressure from within the main body, wherein the one or more exhaust vents (103) are skewed such that an entrance and an exit of each exhaust vent are offset from one another.

2. The deflator valve of claim 1, wherein the plate (104) includes a depression pin (108) projecting from the plate (104) and into the valve stem cavity (107).

3. The deflator valve of claim 1, wherein the plate (104) further includes a seating ring (113) disposed thereon and facing the piston cavity (106).

4. The deflator valve of claim 1, wherein the main body (101) further comprises adjustment threads (111) disposed exterior to the piston cavity (106).

5. The deflator valve of claim 1, further comprising a valve stem O-ring (112) disposed within the valve stem cavity (107) and adjacent to the plate (104).

6. The deflator valve of claim 1, wherein the main body (101) further comprises a threadless lead in (109) that transitions to stem cavity threads (110) disposed within the valve stem cavity (107).

7. The deflator valve of claim 1, further comprising a pawl (202) operatively coupled to the main body (101) and disposed through the valve stem cavity (107).

8. The deflator valve of claim 1, wherein the one or more exhaust vents are circular shaped, square shaped, slotted, or any other regular or irregular shape.

9. A deflator valve for reducing noise and deflation time and improving accuracy and ease of adjusting a pressure setting, comprising:
   a) a main body (101) comprising:
      i) a plate (104) perpendicularly disposed within the main body (101) to divide an interior into a piston cavity (106) and a valve stem cavity (107);
      ii) one or more input ports (102) disposed through the plate (104) for fluidly connecting the valve stem cavity (107) to the piston cavity (106), wherein the one or more input ports (102) are skewed such that for an entrance and an exit of each input port are offset from one another;
      iii) one or more exhaust vents (103) disposed through a sidewall (105) of the main body in the piston cavity (106) for relieving pressure from within the main body, wherein the one or more exhaust vents (103) are skewed such that an entrance and an exit of each exhaust vent are offset from one another;
      iv) a depression pin (108) projecting from the plate (104) and into the valve stem cavity (107);
      v) a seating ring (113) projecting from the plate (104) and facing the piston cavity (106); and
      vi) adjustment threads (111) disposed exterior to the piston cavity (106);
   b) a piston (120) movably disposed in the piston cavity (106), the piston (120) comprising:
      i) a piston O-ring (121) disposed around an outer circumference of the piston, wherein the piston O-ring (121) creates a seal that reduces or eliminates air leaks between the piston (120) and the piston cavity (106);
      ii) a membrane pad (122) disposed on an end of the piston facing the plate (104) and abutting against the seating ring (113); and
      iii) a shaft cavity (124);
   c) a lock nut (150) threadably coupled to the main body (101) via the adjustment threads (111);
   d) an adjustment cap (130) threadably coupled to the main body (101) via adjustment threads (111), wherein the adjustment cap (130) covers the piston cavity (106);
   e) a spring shaft (140) coupled to the adjustment cap (130), the spring shaft (140) having a shaft tip (141) disposed in the shaft cavity (124) such that the shaft tip (141) rest upon a shaft seat (125) in the piston (120); and
   f) a spring (143) wrapped around the spring shaft (140), wherein a first end of the spring sits in an adjustment cap spring seat (133) and a second end of the spring sits in a shaft spring seat (142);
      wherein the adjustment cap (130) is threadably coupled to the main body (101), thereby compressing the spring (143) between the adjustment cap spring seat (133) and the shaft spring seat (142) such that a desired pressure setting is set based on a spring force of the compressed spring (143), wherein the lock nut (150) is threaded to abut against the adjustment cap (130) after the adjustment cap (130) is set.

10. The deflator valve of claim 9, wherein the one or more input ports (102) and the one or more exhaust vents (103) are configured to introduce air into and relieve pressure from within the main body (101) in a vortex, circular flow.

11. The deflator valve of claim 9, wherein the deflator valve is configured to be removably attached to a pressure vessel for deflating the pressure vessel to the desired pressure.

12. The deflator valve of claim 9, further comprising a valve stem O-ring (112) disposed within the valve stem cavity (107) and abutting the plate (104).

13. The deflator valve of claim 12, wherein the main body (101) further comprises a threadless lead in (109) and stem cavity threads (110) disposed within the valve stem cavity (107), wherein the stem cavity threads (110) are disposed between the threadless lead in (109) and the valve stem O-ring (112).

14. The deflator valve of claim 9, further comprising a pawl (202) operatively coupled to the main body (101) and disposed through the valve stem cavity (107).

15. The deflator valve of claim 9, wherein the one or more exhaust vents are circular shaped, square shaped, slotted, or any other regular or irregular shape.

16. The deflator valve of claim 9 further comprising a manual start ring (160) attached to a terminal end of the spring shaft that is disposed through the adjustment cap (130).

17. The deflator valve of claim 9, wherein the spring (143) comprises two individual springs, wherein the springs have the same or different spring rate.

18. The deflator valve of claim 9, wherein the spring (143) is a single, dual rate spring.

19. The deflator valve of claim 9, wherein the spring (143) is a single, variable rate spring.

20. The deflator valve of claim 9, wherein the spring (143) is configured to reduce noise and ease setting of the desired pressure.

* * * * *